Aug. 9, 1966    J. MEDNEY    3,265,795
METHOD OF SKIN MOLDING
Filed May 25, 1964    2 Sheets-Sheet 2
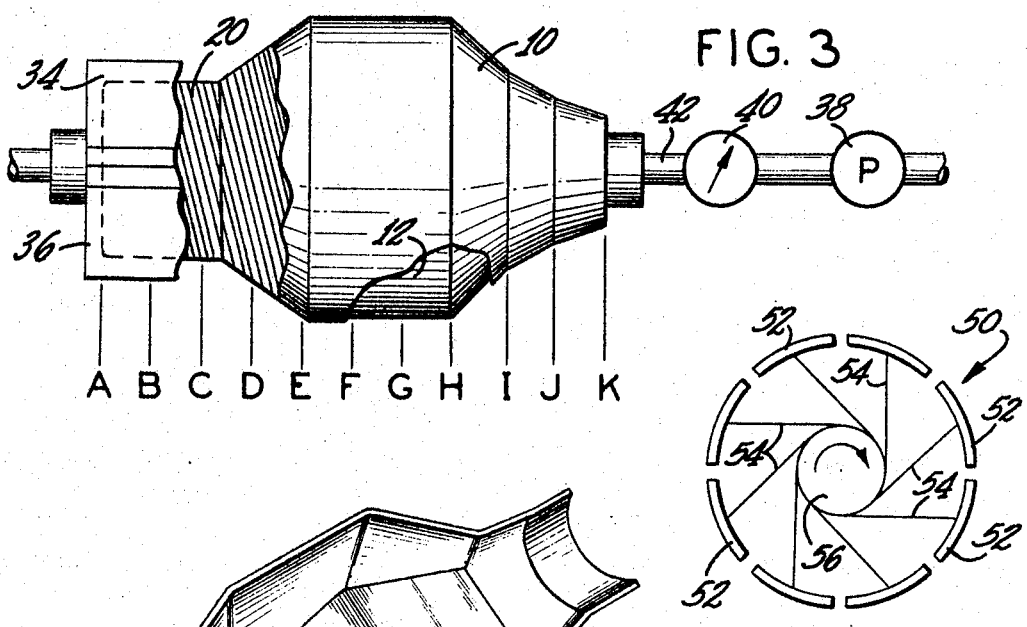
FIG. 3
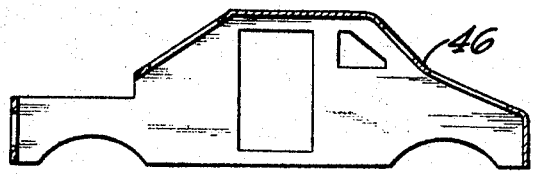
FIG. 7
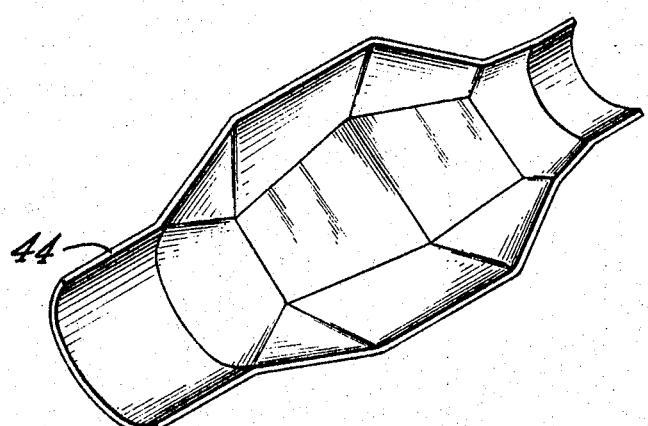
FIG. 4
FIG. 5
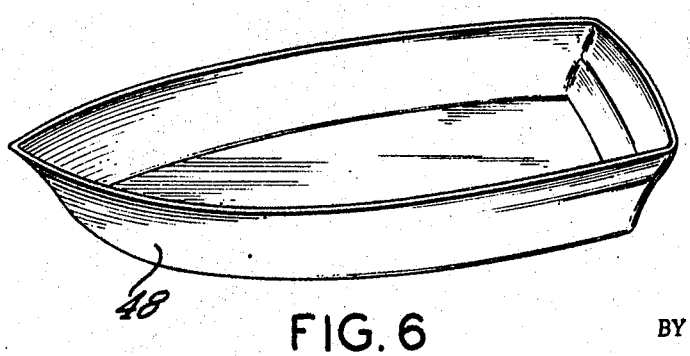
FIG. 6
INVENTOR.
JONAS MEDNEY
BY
Leonard H. King
ATTORNEY.

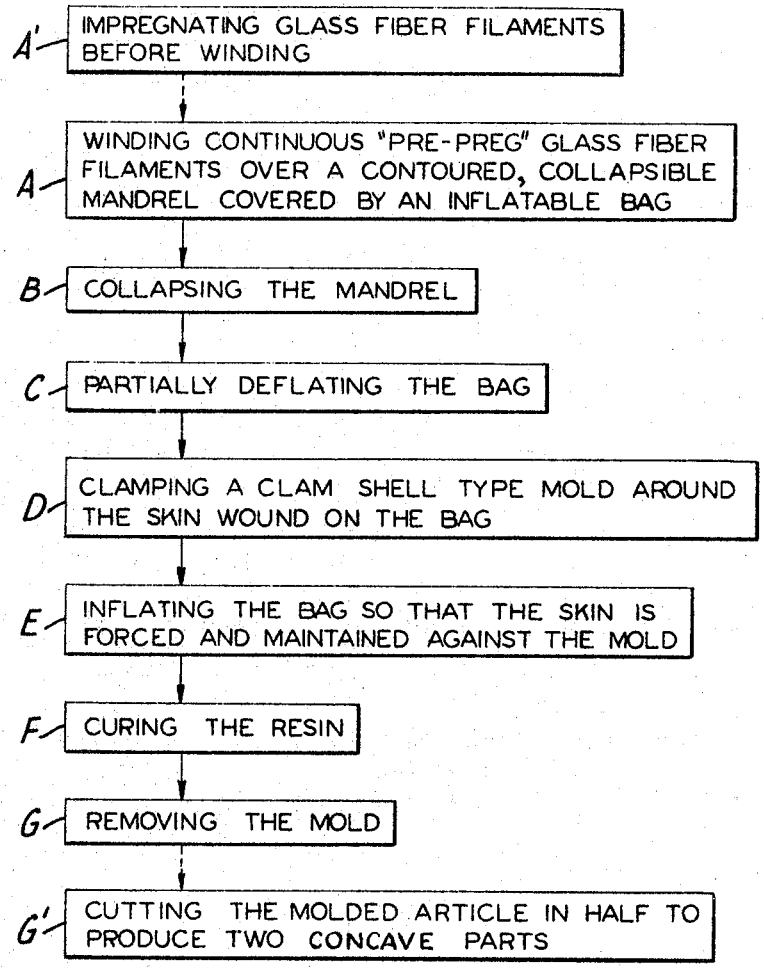
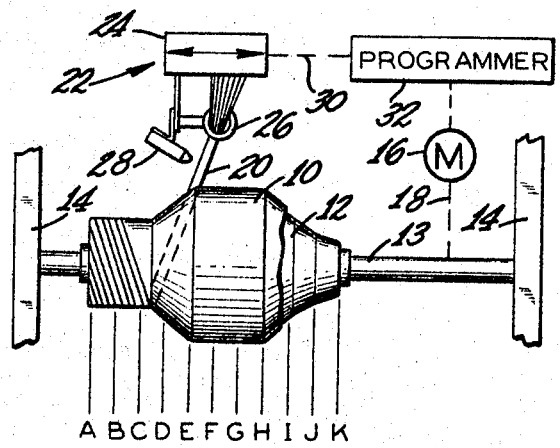

United States Patent Office 3,265,795
Patented August 9, 1966

3,265,795
METHOD OF SKIN MOLDING
Jonas Medney, Oceanside, N.Y., assignor to Koppers Company, Inc., a corporation of Delaware
Filed May 25, 1964, Ser. No. 369,667
13 Claims. (Cl. 264—157)

This invention relates to a method for molding reinforced plastic articles having a nonuniform cross section and more particularly to an improved pressure bag molding method in combination with a winding technique employing continuous, resin impregnated glass fiber filaments.

Several methods are available today for producing resin bonded glass fiber shells. A brief discussion of at least two of the more common and applicable methods would be in order so that the shortcomings thereof will be apparent in comparison with the present invention.

Contact molding or hand lay-up comprises the application of successive layers of resin and filamentary material to a mold member. The resulting assemblage is then compacted by hand, either with or without heat and pressure. Usually, a female mold is used together with reinforcing material such as woven glass cloth or mats which are composed of strands approximately 2 inches long and arranged in a random pattern. The reinforcing material may either be pre-impregnated or impregnated with a suitable resin when placed in the mold.

The hand lay-up type of fabrication results in a product of poor dimensional accuracy. Of even more importance is the fact that the strength of the article, particularly at elevated temperatures and pressures, is far below the inherent capabilities of the material. This is due, for the most part, to the chopped up or discontinuous short lengths of fibers.

Still another method of producing contoured plastic articles is by pressure bag molding. This procedure is similar to that used in contact molding. A bag made of vinyl, rubber, polyvinyl alcohol or other similarly impermeable, flexible sheet, having approximately the shape of the mold, is used as a mandrel. The cloth or mat is draped on the bag which is then inflated. The outward pressure transmitted by the inflated bag forces the filler material into contact with a female mold.

Alternatively, in bag molding, the mat or cloth was draped on a male mold. In this case, the bag surrounding the mold was evacuated, thus applying atmospheric or autoclave pressure, and forcing the filler material to conform to the shape of the mold. The mold member, of course, had to be expendable since it was necessary to break it up or melt it in order to remove it from the finished article.

Like contact molding, the bag molding method of the prior art had several drawbacks that prevented more widespread acceptance. The mats had poor drapability and yielded a varying laminate thickness. Furthermore, when a planar sheet of filler was forced into a nonplanar mold, wrinkles were produced. When the mat or cloth was notched to avoid the wrinkles it resulted in a weakened product. By forming the sheet from any discrete pieces in order to conform to a nonplanar mold, the continuity of the filaments was again destroyed with a resultant loss in stress distribution. This method also proved to be both costly and time consuming.

The method and products of the present invention combine the desirable characteristics of resin impregnated, continuous filament winding and nonplanar bag molding. By winding a skin with continuous filaments, uniform distribution of the filaments can be maintained while at the same time the filaments will operate independently of each other. Using a contoured, collapsible mandrel covered by a deformable bag which can exert uniform outward pressure on the skin assures that the irregular contours of the nonplanar mold member will be faithfully reproduced time after time.

Briefly, the present invention is comprised of the following steps:

(A) Winding a skin on a fully inflated, flexible rubber bag which is on a contoured mandrel having an adjustable cross section shape, the bag and mandrel being adapted for rotation together about a central axis;

(B) Collapsing the mandrel and partially deflating the bag;

(C) Clamping a clamshell mold about the winding, the bag and the mandrel, the mold advantageously being covered with a mold release agent;

(D) Fully inflating the bag to force the skin outwardly into the mold, whereupon the skin is then cured; and (E) First collapsing the mandrel and then removing the skin by deflating the bag.

It should be noted that the instant method of molding is admirably suited to forming two opposed concave halves, as will be described hereinafter. If so employed, then after step (E) above, the cured article would be cut along its major axis to provide two concave shells.

The present invention contemplates the provision of a variety of forms of construction under the general category of hollow elements and curved surfaces. Without limitation to this generality, the present invention provides improved construction for a wide variety of auto bodies, ship hulls, containers, pressure bottles, etc. The present invention also provides for the covering of existing members for such purposes as reinforcement and protective coating.

Accordingly, it is an object of the present invention to provide a molding method that combines the techniques of continuous filament winding and the bag method of molding.

Still another object is to provide an improved method for the forming of resin bonded fibrous structures having a variety of curved shapes and irregular contours.

A further object is to provide a bag molding method for producing fibrous structures having a strength-to-weight ratio characteristic of resin bonded, continuous filament winding techniques.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing, like reference characters designate like parts.

In the drawing:

FIG. 1 is a step-by-step illustration of the method of the present invention including several optional steps;

FIG. 2 is a side elevational view schematically showing an inflatable bag being wound with continuous resin impregnated filaments;

FIG. 3 is a side elevational view, partly broken away, illustrating the clamshell mold clamped about a wound, fully inflated bag;

FIG. 4 pictorially illustrates the finished product after it has been removed from the mold and cut longitudinally in half in accordance with an optional step of the present invention.

FIG. 5 is a longitudinal view in cross section of an automobile body formed by the method of the present invention;

FIG. 6 is a perspective illustration of still another product, a boat hull, formed by the method of the present invention; and FIG. 7 schematically illustrates an adjustable mandrel employed with the present invention.

Referring now to the drawing, FIG. 1 represents the presently preferred steps of the method of this invention. Glass fiber will be used, by way of example, for the filamentary material to be wound because of its strength, corrosion resistance and availability on an economical basis. It is to be understood, however, that the method of the present invention is not limited to the use of such filaments, but rather that any desired and suitable filament may be used.

Epoxide resins, such as the reaction product of epihalohydrin and a polyhydric phenol, as exemplified by bisphenol-epichlorhydrin, are used as the binder for the filamentary material. However, still other equivalent epoxide resins are known to those skilled in the art. Alternatively, the fiber impregnating material may be compounded of an alkyd polyester resin, a formaldehyde resin, or one of the acrylic resins. A suitable mold release agent that may be used in conjunction with the present invention is polyvinyl alcohol.

Disregarding for the moment a detailed description of the structure involved, the basic steps of the method of the present invention are as follows:

(A) A skin is formed by winding continuous, glass fiber filaments on a flexible, inflated bag. The bag is positioned on a collapsible mandrel provided with a plurality of different diameters at various stations along its longitudinal axis. The circumference of these diameters approximate the peripheral dimensions at comparable stations along the longitudinal axis of the mold.

(A') As an alternative step, the filaments may be resin impregnated before their application to the bag.

(B) The mandrel is temporarily collapsed and the bag deflated to a point where the bag diameters can be accommodated by the internal dimension of the mold.

(C) A clamshell type mold, having a release agent coated thereon, is clamped about the wound bag.

(D) The bag is re-inflated such that it forces and maintains the windings against the mold.

(E) The winding is cured for a suitable length of time under conditions of elevated temperature, if the binder is of the thermosetting type. If the binder is of the thermoplastic type, it is allowed to cool and set.

(F) The mold is removed, the mandrel collapsed again, and the bag is deflated so that the finished product may be taken off.

(F') If the design of the mold permits, the finished product may be longitudinally cut to produce a plurality of concave parts.

For purposes of explanation, the bag and mandrel assembly, the mold member and the finished product are, in the drawing, subdivided into various transverse stations A to K. Thus, a particular station on any one of the three aforementioned elements is the companion to the similarly lettered station on each of the other two elements.

If, for example, the product to be molded is an automobile body, then, of course, the mold will have cross sectional configurations identical to the product at comparable stations. The mold of the present invention as the clamshell type having two opposed concave halves. The article that results from the use of this mold is a unitary, hollow, contoured piece comprised of concave halves on either side of the longitudinal center line of the mold.

The mandrel used with the present invention is formed with different diameters at successive stations A to K such that the circumferential dimensions of the various diameters is substantially equal to the peripheral dimensions of the inside of the mold at like stations. In other words, each peripheral dimension of the mold at each station is considered as an irregular or deformed circumference. The circumferential dimension is then converted to a diametrical dimension by using the equation $C = \pi D$ for the purpose of forming the mandrel. A particular mandrel having a changeable cross sectional configuration will be discussed more fully hereinafter in conjunction with FIG. 7.

FIG. 2 shows an inflatable rubber bag 10 supported on a contoured mandrel 12 which is suitably journaled by means of longitudinal shaft 13 in a machine frame, schematically shown and designated by reference character 14. The shaft and consequently bag 10 and mandrel 12, suitably secured thereto, are adapted for rotation by means of motor 16. Coupling means between the shaft and the motor, which may be, for example, a suitably timed gear train, is schematically shown as dashed line 18.

A band 20 of the desired width, composed of a plurality of filaments such as glass fiber, is then applied to fully inflated bag 10. Carriage 22, having a filament supply source 24 and a filament feed-eye 26, shuttles back and forth between the opposed ends of bag 10 while the bag is rotated about the longitudinal axis of shaft 13 by motor 16. During the travel of carriage 22, a nozzle 28 applies a coating of resinous binder to band 20.

Carriage 22 is actuated in timed relation to the rotation of bag 10, the connection means, such as a gear train, being schematically illustrated by dashed line 30. The rate at which carriage 22 travels may be altered by programmer 32 to allow for variances in diameter of mandrel 12 and to thereby provide uniform distribution of band 20. In this connection, feed-eye 26 may also serve to guide the band into a side-by-side, wound configuration.

When the winding step is complete, the mandrel is collapsed, the bag is partially deflated and the upper and lower halves 34 and 36 of a clamshell mold are clamped about the bag. As explained hereinabove, the clamshell mold members are provided with a suitable mold release agent on the winding contacting surfaces thereof. The bag is then fully reinflated by means of pump 38 and valve 40 through line 42 which is in communication with the interior of bag 10.

The pressure of the expanded bag then forces the winding against the mold members whereby the winding assumes the exact contours of the mold without the formation of undesirable ripples or wrinkles. Curing of the resins, as hereinbefore described, is then commenced.

By way of example, a shell 44 is shown in FIG. 4. Shell 44 represents one-half of the hollow article after it is cured and removed from the mold. By machining the necessary cutouts for doors, wheels, hood, windows, etc., the automobile body 46 of FIG. 5 may be fabricated from shell 44.

There is shown in FIG. 6 still another product which may be formed by the method of the present invention. A boat hull 48 is produced by longitudinally cutting in half the hollow shell resulting from the hereinabove described molding process which uses a contoured mandrel, an inflatable bag and a suitably shaped mold member.

FIG. 7 schematically illustrates, by way of example, a mandrel having a radially adjustable outer surface formed from a plurality of separate longitudinal segments. This mandrel may be advantageously used in conjunction with the instant method. However, before discussing the mandrel structure and mode of operation, a brief discussion of the geometry involved would be in order.

Given a square and a circle having perimeters of equal dimension, the diameter of the circle will be 1.26 times the length of any one side of the square. Thus it would appear that a square clamshell mold could not be positioned over a circular, filament wound shell.

To overcome this problem, the glass fiber filaments are wound on a fully inflated flexible bag which is supported by a mandrel having a longitudinal outer surface that can, at a particular time on the winding process, be drawn radially inward. This support is necessary because the winding is carried out under tension. After the winding operation is completed, the mandrel is drawn inwardly along its longitudinal axis and the bag is partially deflated. The reduction in bag diameter permits the positioning of the clamshell mold about the windings whereupon the bag is again fully inflated to force the wound skin outwardly against the interior surface of the mold.

In the embodiment illustrated, collapsible mandrel 50 is comprised of a plurality of longitudinal segments 52 that are radially movable inwardly. In the fully expanded condition, the mandrel serves as a support for the flexible, contoured bag during the winding step of the process.

Segments 52 are mounted on the outer ends of radial spokes 54 which are secured, at their inner ends, to a longitudinal, central core 56. Rotation of core 56 about the longitudinal axis of mandrel 50 will cause each of the mandrel segments 52 to be drawn inwardly. The flexible bag may then be partially deflated and the clamshell mold positioned thereabout, as described hereinbefore. The gaps between the segments permit the mandrel to be collapsed and yet do not substantially diminish the support surface for the bag.

In some instances, a mandrel of relatively small diameter may be employed and the wound skin designed to expand in the hoop direction in order to fill the mold.

Considerable saving in time can be achieved by the use of a skin wound in accordance with the present invention, as opposed to a cloth lay-up. Further, there is concurrent reduction in the cost of labor since fewer man hours are required. Additionally, less labor skill is required, thus further reducing the cost of the end product.

By using a method which combines and takes advantage of the best characteristics of filament winding and bag molding, the uncured skin is provided with increased drapability. The finished product has a high glass/resin density which means that the product will be marked by exceptional strength without excessive weight. The strength obtained in a skin of the type referred to is due to the fact that the individual filaments of the reinforcing units operate independently of each other and are not subjected to tearing or breakage when they are crossed by other filaments of the winding. Thus, each filament is able to uniformly distribute stress loads over a maximum area of the laminate. The process is capable of complete automation as no labor is directly involved.

While the process has been described generally as being capable of producing concave shells, it should be understood that the finished products may be two identical halves, or not, depending upon the choice of mandrel, bag and mold. Further, it is within the scope of the invention to produce more than two concave shells from a single winding merely by longitudinally cutting the wound skin the proper number of times. Again, this is a design consideration to be taken into account when the structure is fabricated. Depending upon the design of the mold and the finished part, the wound skin may be longitudinally cut either before or after it is removed from the mold.

There has been disclosed heretofore, the best embodiments of the invention presently contemplated and it is to be understood that various changes and modifications may be made by those skilled in the art without departing from the spirit of the invention.

What is claimed is:

1. The method of molding a resin bonded filament wound shell comprising the steps of:
    (A) winding inelastic filaments under tension to form a filamentary skin, said winding step being performed on a contoured, collapsible mandrel having a plurality of different diameters which is covered by a flexible, fully inflated bag;
    (B) collapsing the mandrel radially inward;
    (C) partially deflating the bag;
    (D) positioning a mold member having dimensions similar to the mandrel at comparable stations against the wound skin;
    (E) fully reinflating the flexible bag whereby the skin is forced into contact with the mold member;
    (F) curing the resin; and
    (G) removing the skin from the mold.

2. The method of claim 1 including the step of cutting the skin along the longitudinal axis thereof after step (G) to produce a plurality of concave shells.

3. The method of claim 1 including the step of applying a release agent to the mold member prior to step (D).

4. The method of claim 1 wherein step (F) includes maintaining said bag inflated.

5. The method of claim 1 including the steps of collapsing the mandrel and deflating the bag prior to step (G).

6. The method of molding a resin bonded filament wound shell comprising the steps of:
    (A) placing a fully inflated, flexible bag on a contoured, collapsible mandrel having a plurality of different diameters;
    (B) positioning the end of an inelastic filament strand against the bag while applying tension to the filament strand;
    (C) rotating the bag on its longitudinal axis;
    (D) shuttling the tensioned filament strand back and forth between the ends of the bag;
    (E) applying a resinous bonding agent to the filament strand while the strand is being shuttled back and forth to complete the winding and fully cover the bag;
    (F) collapsing the mandrel radially inward;
    (G) partially deflating the bag;
    (H) positioning a mold member against the wound skin;
    (I) fully reinflating the flexible bag whereby the skin is forced into contact with the mold member;
    (J) maintaining the skin against the mold member having dimensions similar to the mandrel at comparable stations under pressure;
    (K) curing the resin;
    (L) removing the mold;
    (M) deflating the flexible bag; and
    (N) removing the skin.

7. The method of claim 6 including the step of cutting the skin along the longitudinal axis thereof after step (N) to produce a plurality of concave shells.

8. The method of claim 6 including the step of applying a release agent to the winding contacting surface of the mold member prior to step (H).

9. The method of claim 6 including the step of collapsing the mandrel prior to step (M).

10. The method of molding an automobile body shell comprising the steps of:
    (A) forming a nonplanar mold member having at least several different peripheral dimensions transverse its longitudinal axis at successive stations, said dimensions being substantially twice the peripheral dimensions of the automobile body shell to be molded at comparable stations;
    (B) forming a nonplanar, collapsible mandrel having at least several different circular cross sections transverse its longitudinal axis, the circumferential dimensions at successive stations being substantially equal to the peripheral dimensions of the mold member at comparable stations, the mandrel being collapsible in a radially inward direction;
    (C) positioning a fully inflated flexible bag over the mandrel;
    (D) winding under tension a resin bonded, inelastic filamentary skin on the bag;
    (E) collapsing the mandrel radially inward;
    (F) partially deflating the bag;
    (G) positioning the mold member against the wound skin;
    (H) fully reinflating the flexible bag whereby the skin is forced into contact with the mold member;
    (I) curing the resin;
    (J) removing the skin from the mold; and (K) cutting the skin along its longitudinal axis to produce a plurality of concave shells.

11. The method of molding an automobile body shell comprising the steps of:
- (A) winding under tension a resin bonded, inelastic filamentary skin on a flexible, fully inflated bag covering a nonplanar collapsible mandrel, the mandrel having at least several different circular cross sections transverse its longitudinal axis, the circumferential dimensions at successive stations being substantially twice the peripheral dimensions of the automobile body shell to be molded at comparable stations, the mandrel being collapsible in a radial inward direction;
- (B) collapsing the mandrel radially inward;
- (C) partially deflating the bag;
- (D) positioning a nonplanar mold member against the wound skin, the mold member having at least several different peripheral dimensions transverse its longitudinal axis at successive stations, said dimensions being substantially twice the peripheral dimensions of the automobile body shell to be molded at comparable stations;
- (E) fully reinflating the flexible bag whereby the skin is forced into contact with the mold member;
- (F) curing the resin;
- (G) removing the skin from the mold; and
- (H) cutting the skin along its longitudinal axis to produce a plurality of concave shells.

12. The method of molding a boat hull comprising the steps of:
- (A) forming a nonplanar mold member having at least several different peripheral dimensions transverse its longitudinal axis at successive stations, said dimensions being substantially twice the peripheral dimensions of the boat hull to be molded at comparable stations;
- (B) forming a nonplanar, collapsible mandrel having at least several different circular cross sections transverse its longitudinal axis, the circumferential dimensions at successive stations being substantially equal to the peripheral dimensions of the mold member at comparable stations, the mandrel being collapsible in a radially inward direction;
- (C) positioning a fully inflated flexible bag over the mandrel;
- (D) under tension winding a resin bonded, inelastic filamentary skin on the bag;
- (E) collapsing the mandrel radially inward;
- (F) partially deflating the bag;
- (G) positioning the mold member against the wound skin;
- (H) fully reinflating the flexible bag whereby the skin is forced into contact with the mold member;
- (I) curing the resin;
- (J) removing the skin from the mold; and
- (K) cutting the skin along its longitudinal axis to produce a plurality of concave shells.

13. The method of molding a boat hull comprising the steps of:
- (A) winding under tension a resin bonded, inelastic filamentary skin on a flexible, fully inflated bag covering a nonplanar, collapsible mandrel, the mandrel having at least several different circular cross sections transverse its longitudinal axis, the circumferential dimensions at successive stations being substantially twice the peripheral dimensions of the boat hull to be molded at comparable stations, the mandrel being collapsible in a radially inward direction;
- (B) collapsing the mandrel radially inward;
- (C) partially deflating the bag;
- (D) positioning a nonplanar mold member against the wound skin, the mold member having at least several different peripheral dimensions transverse its longitudinal axis at successive stations, said dimensions being substantially twice the peripheral dimensions of the boat hull to be molded at comparable stations;
- (E) fully reinflating the flexible bag whereby the skin is forced into contact with the mold member;
- (F) curing the resin;
- (G) removing the skin from the mold; and
- (H) cutting the skin along its longitudinal axis to produce a plurality of concave shells.

References Cited by the Examiner

UNITED STATES PATENTS

| | | | |
|---|---|---|---|
| 2,119,479 | 5/1938 | Bacon | 264—157 |
| 2,695,256 | 11/1954 | De Olloqui et al. | |
| 2,862,541 | 12/1958 | Brink. | |
| 2,995,781 | 8/1961 | Sipler | 264—137 |

ROBERT F. WHITE, *Primary Examiner.*

S. A. HELLER, *Assistant Examiner.*